United States Patent [19]
Kobayashi

[11] Patent Number: 5,645,338
[45] Date of Patent: *Jul. 8, 1997

[54] LIGHT DISTRIBUTION CONTROL DEVICE FOR VEHICULAR HEADLAMP

[75] Inventor: Shoji Kobayashi, Shizuoka, Japan

[73] Assignee: Koito Manufacturing Co., Ltd., Tokyo, Japan

[*] Notice: The term of this patent shall not extend beyond the expiration date of Pat. No. 5,343,371.

[21] Appl. No.: 281,088

[22] Filed: Jul. 27, 1994

[30] Foreign Application Priority Data

Aug. 3, 1993 [JP] Japan .................. 5-192357

[51] Int. Cl.$^6$ .................................. B60Q 1/04
[52] U.S. Cl. ............... 362/61; 362/276; 362/284; 362/324; 362/351
[58] Field of Search .................. 362/37, 36, 276, 362/802, 61, 66, 284, 319, 277, 324, 351, 80, 323, 305, 280, 282

[56] References Cited

U.S. PATENT DOCUMENTS

| | | | |
|---|---|---|---|
| 3,393,344 | 7/1968 | Engelmann | 362/276 X |
| 4,807,101 | 2/1989 | Milde, Jr. | 362/276 |
| 4,875,141 | 10/1989 | Miyauchi et al. | 362/61 |
| 4,967,319 | 10/1990 | Seko | 362/61 |
| 5,060,120 | 10/1991 | Kobayashi et al. | 362/61 |
| 5,068,768 | 11/1991 | Kobayashi | 362/61 |
| 5,138,540 | 8/1992 | Kobayashi et al. | 362/268 |
| 5,158,352 | 10/1992 | Ikegami et al. | 362/61 X |
| 5,193,894 | 3/1993 | Lietar et al. | 362/66 |
| 5,339,226 | 8/1994 | Ishikawa | 362/61 |
| 5,343,371 | 8/1994 | Kobayashi et al. | 362/61 |
| 5,379,196 | 1/1995 | Kobayashi et al. | 362/61 |

OTHER PUBLICATIONS

Japanese Published Unexamined (Kokai) Utility Model Application No. 60–61942.

*Primary Examiner*—Ira S. Lazarus
*Assistant Examiner*—Thomas M. Sember
*Attorney, Agent, or Firm*—Sughrue, Mion, Zinn, Macpeak & Seas

[57] ABSTRACT

A light distribution control device includes a projection type headlamp for a motor vehicle in which a clear cut line in a light distribution pattern is varied by rotating a shade for forming a clear cut line about a horizontal support shaft. A vehicle-to-vehicle distance measuring sensor for measures a distance between a vehicle carrying the light distribution control device and another vehicle running in front of the former, and a shade rotation control unit controls the rotational position of the shade. The angular position of the shade at which the amount of glare at an eye point specified by a vehicle-to-vehicle distance and a rotation angle of the steering wheel is smaller than a tolerable quantity of glare is stored in the form of table data in the control unit. The control unit sets the rotational angle of the shade on the basis of distance information measured by the vehicle-to-vehicle distance measuring sensor, and the steering angle of the steering wheel.

14 Claims, 6 Drawing Sheets

LIGHT DISTRIBUTION CONTROL DEVICE FOR VEHICULAR HEADLAMP

BACKGROUND OF THE INVENTION

The present invention relates to a light distribution control device for varying the light distribution pattern of a headlamp, and more particularly to a light distribution control device for use with a headlamp which varies a clear-cut line in the light distribution pattern of the headlamp in accordance with the distance between the motor vehicle on which the headlamp is mounted and another motor vehicle traveling in front of the former.

The light distribution pattern of a conventional headlamp for a motor vehicle can be switched between a high beam pattern providing good visual recognition for long range illumination and a low beam having good visual recognition for short range illumination. The high beam is used when there is no vehicle closely in front or no approaching vehicle. When overtaking or meeting other vehicles, the light distribution pattern is switched to the low beam pattern, which has a clear-cut line so as to cause no glare to the driver of an approaching or close vehicle.

Figure 8:
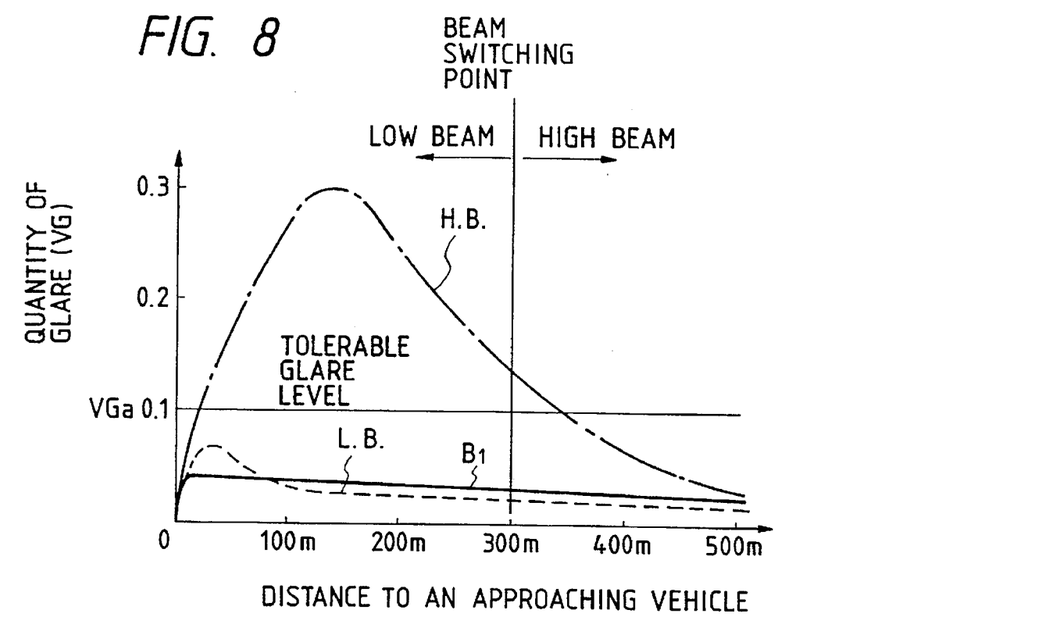
FIG. 8 is a graph showing the relationship between a quantity of glare and the distance between a vehicle and an approaching vehicle.
Figure 9:
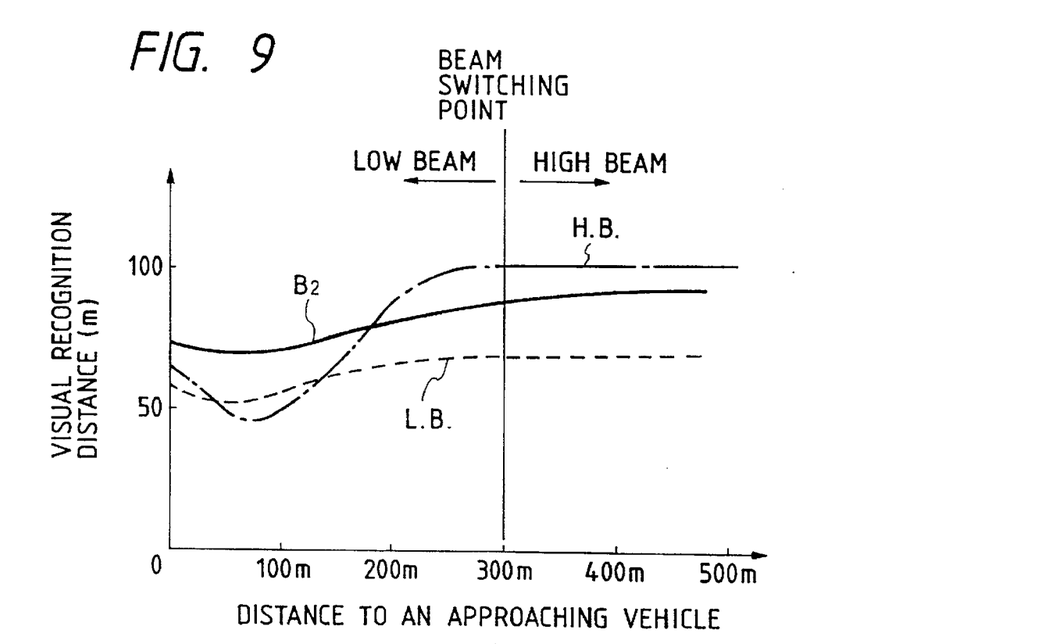
FIG. 9 is a graph showing the relationship between a visual recognition distance and the distance between a vehicle and an approaching vehicle.

FIGS. 8 and 9 are graphical representations of variations of the amount of glare and the visual recognition distance in the case where two motor vehicles equipped with conventional sealed-beam headlamps of the double-bulb type pass each other on a straight road. FIG. 8 shows the amount of variation of glare perceived by a driver when receiving a light beam from the headlamps of another vehicle. (The amount of glare perceived is quantitatively expressed in terms of a quantity of glare VG with respect to distance relative to an approaching vehicle.) FIG. 9 shows the variation of visual recognition distance with respect to distance relative to an approaching vehicle. As seen from those figures, when two vehicles pass each other while using high beams, the glare quantity exceeds a tolerable quantity of glare VGa at approximately 300 meters of vehicle-to-vehicle distance (FIG. 8). Accordingly, an approaching driver perceives excessive glare. To avoid the glare, the driver in the other vehicle should switch the light distribution pattern from the high beam to the low beam.

If the driver fails to switch to the low beam, the approaching driver can be blinded by the glare. If vehicles pass each other under such conditions, a very dangerous situation is created. On the other hand, when the beam pattern is switched from the high beam to the low beam, the visual recognition distance is abruptly decreased from 100 meters to 70 meters, as seen from a graph of FIG. 9. This is also dangerous.

SUMMARY OF THE INVENTION

The present invention was made in view of the foregoing problems. The inventor has studied and developed headlamps of a variable clear-cut line type in which the clear-cut line of the light distribution pattern is vertically varied by rotating a shade about the horizontal axis. The glare quantity VG of the light beam from the headlamp was investigated in connection with the vehicle-to-vehicle distance and the position of the eyes of the driver in an approaching vehicle (this position is referred to as an eye point). Through the investigation, it was found that the problems of the conventional headlamps could be solved by vertically moving the clear-cut line in accordance with the vehicle-to-vehicle distance and the eye point so that the quantity of glare is controlled to be below a tolerable quantity.

Figure 7A:
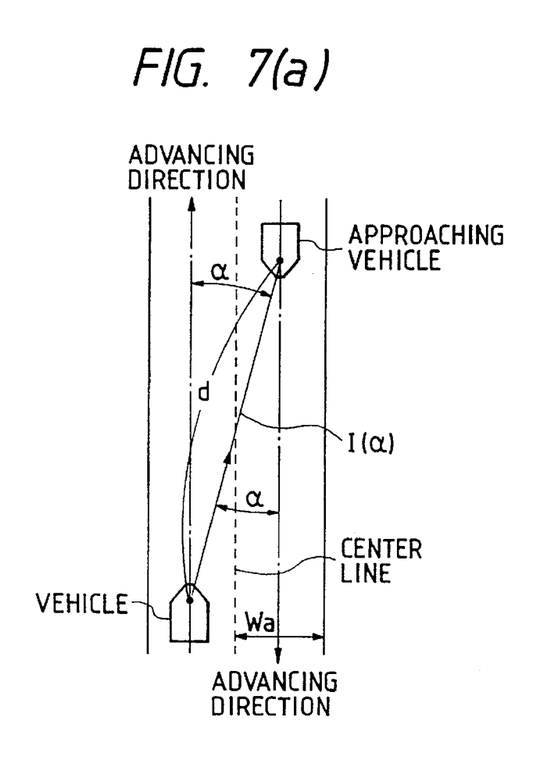
FIGS. 7(a) and 7(b) are diagrams used in explaining relationships between a vehicle and an approaching vehicle on a linear road and a curved road, of which the diagram of FIG. 7(a) shows a straight road, the diagram of FIG. 7(b) a curved road, and the diagram of FIG. 7(c) the relationship between the rotational angle of the steering wheel and the curvature of the curved road in negotiating the curved road.

More specifically, the clear-cut line in a light distribution pattern produced by a headlamp for a motor vehicle can be set at a desired level by properly rotating the shade about the horizontal shaft. In other words, by properly rotating the shade, the clear-cut line can be vertically adjusted so as to eliminate glare light at specified points on a light distribution screen. When two vehicles pass each other on a straight road as shown in FIG. 7(a), the glare quantity VG is mathematically expressed by $$VG = K \cdot I(\alpha)/d^2(\alpha+1.5°)\alpha,$$

where d: vehicle-to-vehicle distance of the two vehicles; $\alpha$: direction of the eye point with respect to the optical axis of the lamp (referred to as an eye point angle); $I(\alpha)$: intensity of light beams directed to the eye point; K: constant.

Figure 5:
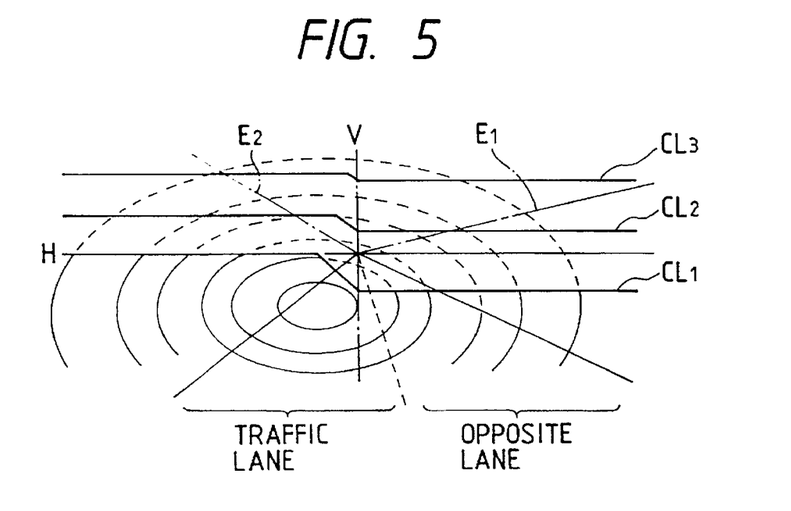
FIG. 5 is a diagram showing variations of the clear-cut line of a light distribution pattern formed by the headlamp.

The locus of the eyes of the approaching driver, i.e., the locus of the eye point, is expressed by a straight line $E_1$ in FIG. 5. Accordingly, the locus of the approaching driver's eyes can be defined by the vehicle-to-vehicle distance d and the eye point angle $\alpha$. Thus, if the eye point angle $\alpha$ is known, the intensity $I(\alpha)$ of the light beams directed to the eye point can be calculated, and if the vehicle-to-vehicle distance d and the eye point angle $\alpha$ are known, the glare quantity VG at the eye point can be calculated. Therefore, the angular position of the rotating shade which provides an optimum clear-cut line capable of reducing the glare quantity VG to a preset value or less can be uniquely defined.

An optimal clear-cut line position is obtained by the following approach. The relationships between the vehicle-to-vehicle distance d and the eye point angle $\alpha$, as well as the proper angular positions $\theta$ of the rotating shade (clear-cut line positions) where the glare quantity VG at the eye point defined by the values d and $\alpha$ is smaller than a tolerable level, are previously obtained and tabulated. These items of data are electronically stored in the form of table data in a memory of a microcomputer carried on the motor vehicle. An instrument of known type electrically coupled to the microcomputer measures the distance of the vehicle to a forerunning or approaching vehicle and an eye point angle $\alpha$. The microcomputer computes the angular position $\theta$ of the rotating shade using the measured values d and $\alpha$, and rotates the shade up to the computed angular position $\theta$.

The present invention has been made in view of the above circumstances and on the basis of the aforementioned technical concept.

Accordingly, an object of the invention is to provide a light distribution control device capable of automatically varying a light distribution pattern in such a manner as to avoid glare. Another object of the invention is to provide a light distribution control device capable of varying a light distribution pattern appropriately in accordance with a distance between a motor vehicle and another motor vehicle in front of the former.

The above and other objects can be achieved by a provision of a light distribution control device for vehicular headlamps which, according to the present invention, includes a projection type headlamp for a motor vehicle in which a clear-cut line in a light distribution pattern is varied about a horizontal support shaft by rotating a shade for forming a clear-cut line, a vehicle-to-vehicle distance measuring sensor for measuring a distance between a vehicle carrying the light distribution control device and another vehicle running in front of the former, and a shade rotation control unit for controlling the rotation of the shade, wherein the angular position of the shade at which the quantity of glare at the eye point specified by the vehicle-to-vehicle distance is smaller than a tolerable quantity of glare is stored in the form of table data in the control unit, and the control unit controls the rotational angle of the shade on the basis of distance information measured by the vehicle-to-vehicle distance measuring sensor.

Another aspect of the invention concerns a light distribution control device for vehicular headlamps such that the table data contains data representative of shade angular positions for both approaching and forerunning vehicles (i.e., vehicles respectively either coming toward the control-device carrying vehicle or in front of the control-device carrying vehicle traveling in the same direction), and the shade rotation control unit differentiates distance information sequentially coming from the vehicle-to-vehicle distance measuring sensor with respect to time, and determines whether the vehicle running in front of the control-device carrying vehicle is an approaching vehicle or a forerunning vehicle on the basis of speed information resulting from the differentiation.

Still another aspect of the invention relates to a light distribution control device for headlamps for a motor vehicle comprising: a projection type headlamp for a motor vehicle in which a clear-cut line in a light distribution pattern is varied by rotating a shade for forming a clear-cut line about a horizontal support shaft, a vehicle-to-vehicle distance measuring sensor for measuring a distance between a vehicle carrying the light distribution control device and another vehicle running in front of the former, a steering sensor for measuring a quantity of turn of a steering wheel, and a shade rotation control unit for controlling the rotational angle of the shade, wherein the angular position of the shade at which the quantity of glare at the eye point specified by the vehicle-to-vehicle distance and the rotational angle of the steering wheel is held smaller than a tolerable quantity of glare is stored in the form of table data in the control unit, and the control unit controls the rotational angle of the shade on the basis of distance information measured by the vehicle-to-vehicle distance measuring sensor and the rotational angle of the steering wheel.

Still another aspect of the invention relates to a light distribution control device for vehicular headlamps wherein the table data contains data representative of shade angular positions for approaching and forerunning vehicles as the vehicle running in front of the control-device carrying vehicle, and the shade rotation control unit differentiates distance information sequentially coming from the vehicle-to-vehicle distance measuring sensor with respect to time, and determines whether the vehicle running in front of the control-device carrying vehicle is an approaching vehicle or a forerunning vehicle on the basis of speed information resulting from the differentiation.

In the light distribution control device thus constructed, the angular position of the shade at which a quantity of glare at the eye point specified by the vehicle-to-vehicle distance is smaller than the tolerable quantity of glare is stored in the form of table data in the shade rotation control unit. When receiving distance information from the vehicle-to-vehicle distance measuring sensor, the control unit causes the shade to rotate by a preset quantity, thereby forming a clear-cut line that results in no glare at the eye point.

Further, in the light distribution control device of the invention, the angular position of the shade at which the quantity of glare at the eye point specified by a vehicle-to-vehicle distance and the rotational angle of the steering wheel is smaller than a tolerable quantity of glare is stored in the form of table data in the control unit. Upon receiving distance information from the vehicle-to-vehicle distance measuring sensor and the rotational angle of the steering wheel from the steering sensor, the control unit causes the shade to rotate by a preset quantity of rotation, thereby forming an optimal clear-cut line that provides no glare at the eye point.

Still further, in the light distribution control device according to the present invention, the shade rotation control unit determines whether the vehicle running in front of the control-device carrying vehicle is an approaching vehicle or a forerunning vehicle, and controls the rotation of the shade on the basis of the table data for the approaching vehicle or the forerunning vehicle.

DESCRIPTION OF THE PREFERRED EMBODIMENTS

Preferred embodiments of the present invention now will be described with reference to the accompanying drawings.

Figure 1:
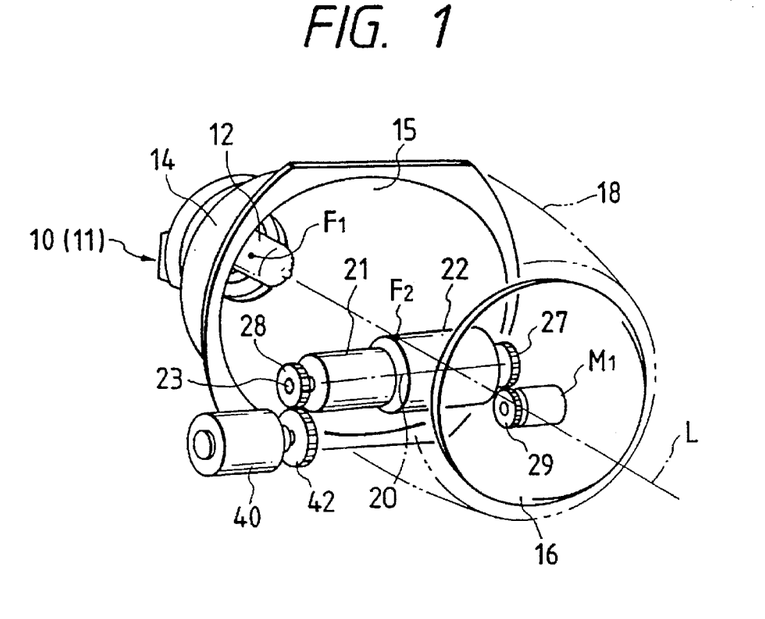
FIG. 1 is a perspective view showing a key portion of a projection type headlamp for a motor vehicle, which is used for a light distribution control device according to the present invention.
Figure 2:
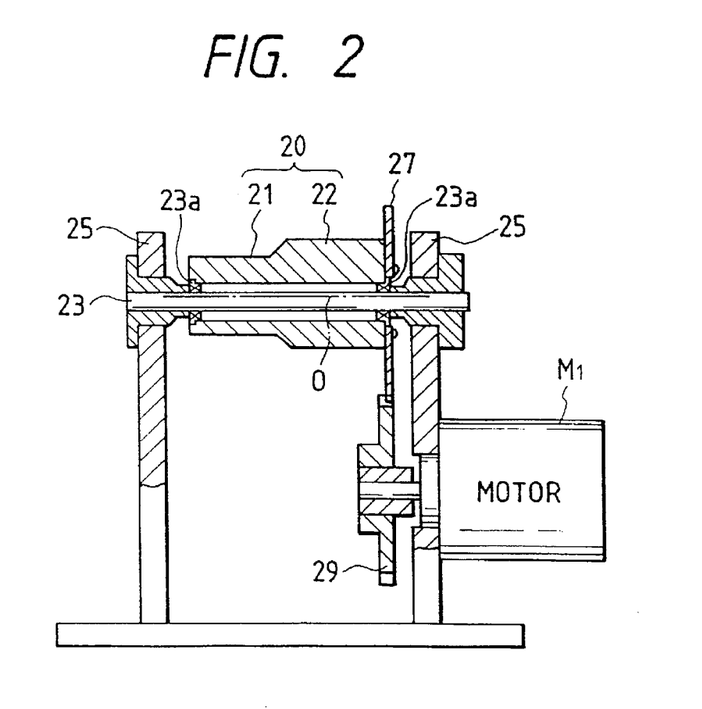
FIG. 2 is a longitudinal sectional view showing a shade provided in the headlamp.
Figures 3, 4:
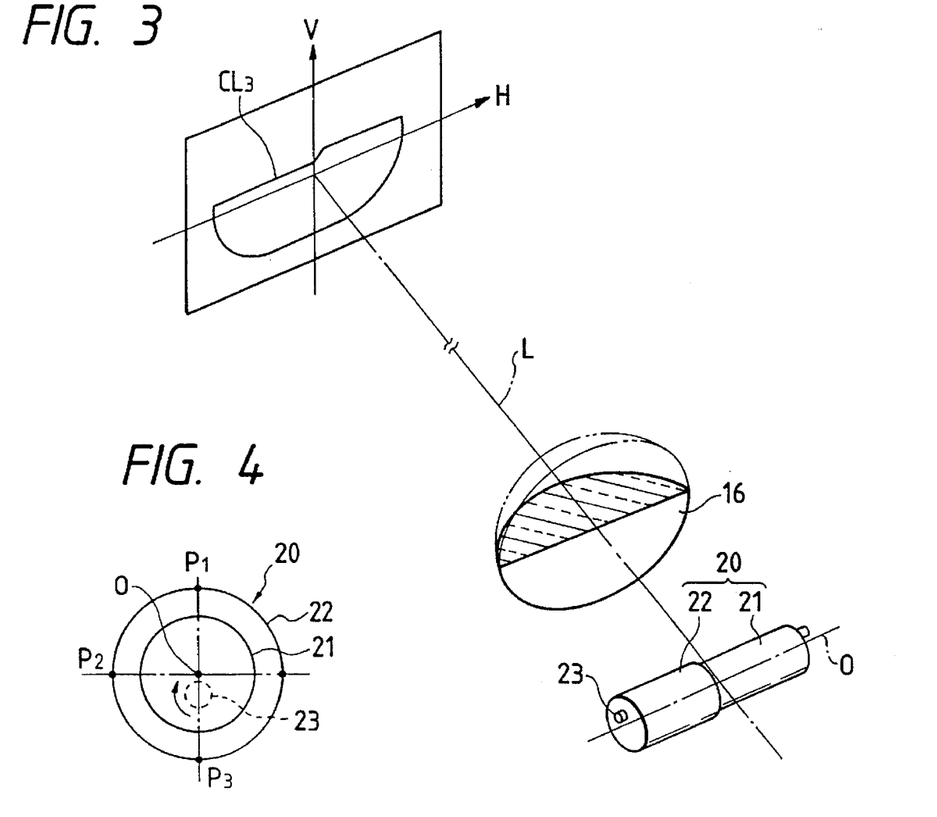
FIG. 3 is a perspective view showing a light distribution pattern formed by the combination of a shade and a headlamp when viewed by a driver in the vehicle on which the headlamp is mounted.
FIG. 4 is a diagram used in explaining the shape of the shade (when seen from the left in FIG. 1)
Figure 6:
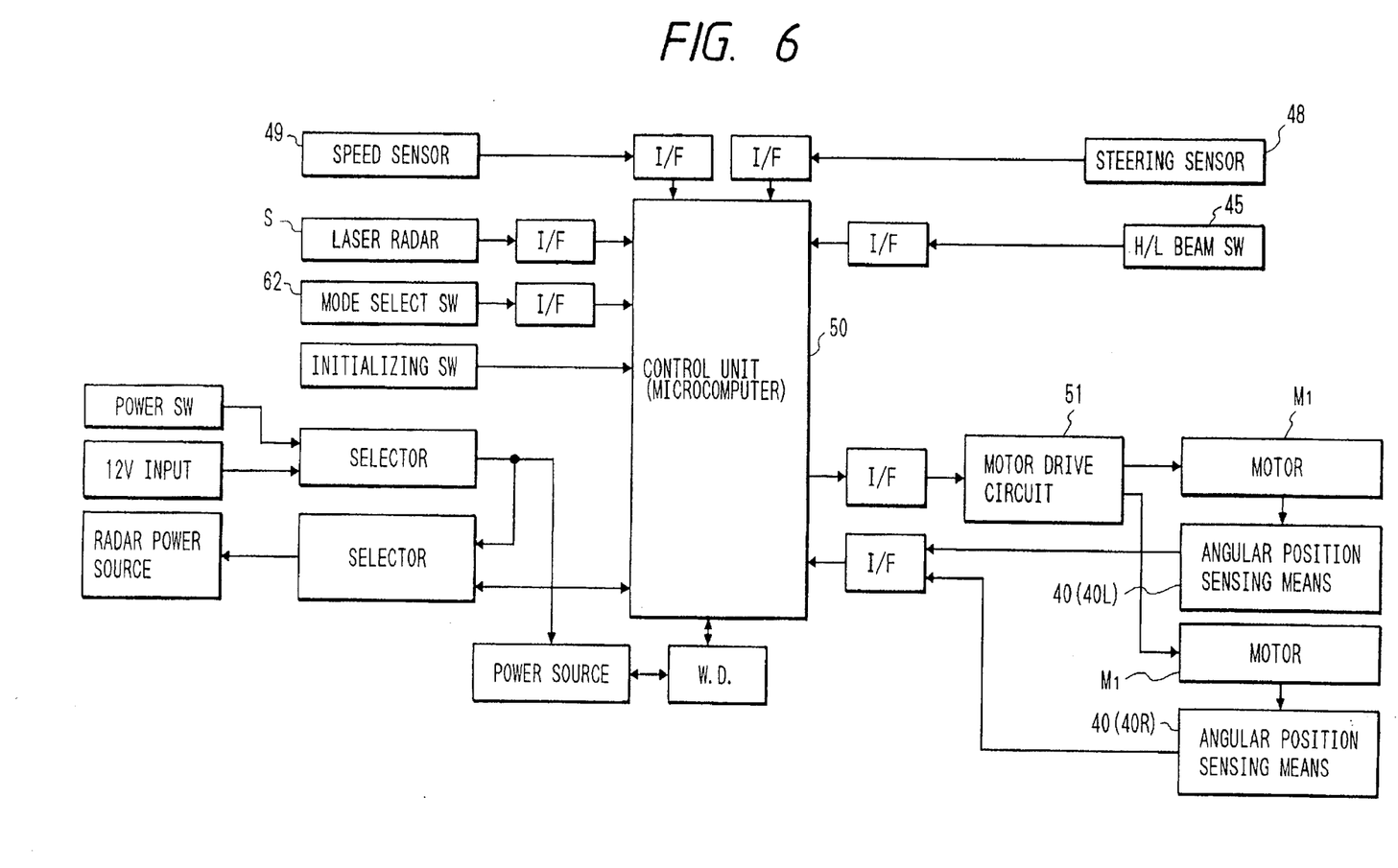
FIG. 6 is a block diagram showing an overall light distribution control device for the headlamp according to the present invention.

FIGS. 1 through 6 show an embodiment of a light distribution control device according to the present invention. Of these figures, FIG. 1 is a perspective view showing the inner structure of a projection type headlamp for a motor vehicle, manufactured for countries such as Japan where keep-to-the-left rules apply, and which is used for a light distribution control device according to the present invention, FIG. 2 is a longitudinal sectional view showing a shade provided in the headlamp, FIG. 3 is a perspective view showing a light distribution pattern formed by the combination of the above shade and headlamp viewed by a driver in a vehicle having the headlamp, FIG. 4 is a diagram useful in explaining the shape of the shade (when seen from the left in FIG. 1), FIG. 5 is a diagram showing variations of the clear-cut line of a light distribution pattern formed by the headlamp, and FIG. 6 is a block diagram showing an overall light distribution control device for the headlamp according to the present invention.

The light distribution control device according to the present embodiment includes a projection type headlamp 10 for a motor vehicle in which the clear-cut line can vertically be varied by rotating a shade 20 (FIG. 1), a laser radar S for measuring the dimeasuring the distance of the motor vehicle on which the headlamp is mounted to a forerunning or approaching vehicle (FIG. 6), and a shade rotation control unit 50 for controlling the rotational angle of the shade 20 in accordance with information from the laser radar S and a steering sensor 48 (FIG. 6).

The laser radar may be installed at a suitable position on the motor vehicle, for example, inside the front grill or under a bumper.

In FIG. 1 showing a key portion of the headlamp used for the light distribution control device, reference numeral 11 designates a projection unit, contained in a capsule-like lamp body (not shown) and supported by an aiming mechanism (not shown). The projection unit 11 is supported in a state where it is tiltable about a horizontal and a vertical axis (not shown). By operating the aiming mechanism, the projection unit 11 is tilted, that is, the direction of the light beam projected from the projection unit 11 (the optical axis L of the headlamp 10) can be adjusted vertically and horizontally. The structure of the headlamp as described above is the same as that of a conventional, general projection-type headlamp.

The projection unit 11 is constructed such that a substantially elliptical reflector 14 with a discharge bulb 12 as a light source inserted therein and a projection lens 16 located in front of the reflector 14 are assembled into a tubular lens holder 18. The inner side of the reflector 14 is coated with aluminum using a suitable deposition method, thereby forming an elliptical reflecting surface 15. The reflecting surface 15, as is well known, has first and second focal points F1 and F2. The discharge part of the discharge bulb 12 is positioned at the first focal point F1. A shade 20 is positioned at the focal point of the projection lens 16 and near the second focal point F2. The shade 20 forms a clear-cut line in the subbeam by cutting parts of light beam that are reflected by the reflector 14 and directed toward the projection lens 16. The light emitted by the discharge bulb 12 is reflected by the elliptical reflecting surface 15 and then guided forward, collimated, and projected into the space ahead of the headlamp by the projection lens 16.

The shade 20 is composed of a tubular member having a left shade 21 (located on the left side when seen from the projection lens 16), which is tubular and small in diameter, and a right shade 22 (located on the right side when seen from the projection lens 16), which is tubular and large in diameter. The left shade 21 and the right shade 22 are unitarily formed. The tubular member is rotatably supported by a horizontal support shaft 23 horizontally extended and passing through the shade 20. Reference numeral 23a designates bearings, located between the horizontal support shaft 23 and the shade 20, for supporting both ends of the shade 20. Reference numeral 25 designates a frame for supporting the horizontal support shaft. The horizontal support shaft 23 is a rotationally mounted tubular member which defines the center of rotation of the shade 20, is offset from the axial center 0 of the shade 20, as shown in FIG. 4. In other words, the shade 20 is eccentric with respect to the horizontal support shaft 23. Accordingly, when the shade 20 rotates, the clear-cut line vertically moves within a range indicated by CL1, CL2 and CL3 FIG. 5.

In the mode shown in FIG. 4 in which a point $P_1$ on the upper edge of the shade 20 is at the highest position (in this mode, the ridge of the shade 20 is at the highest position), the clear-cut line formed by the shade 20 is at a level CL1 (lowest level) in FIG. 5. When the shade 20 is gradually rotated clockwise (in the direction of an arrow in FIG. 4) from this position, the clear-cut line gradually rises in level. In another mode in which a point $P_2$ on the upper edge of the shade 20 is at the highest position, the clear-cut line formed by the shade 20 is at a level CL2 in FIG. 5. In yet another mode in which a point $P_3$ on the upper edge of the shade 20 is at the highest position (in this mode, the ridge of the shade 20 is at the lowest position), the clear-cut line formed by the shade 20 is at a level CL3 (highest level) in FIG. 5.

Gears 27 and 28 are mounted on respective ends of the shade 20. The gear 27 is in mesh with a drive gear 29 mounted on the output shaft of the motor M1. When the motor M1 is driven, the shade 20 is rotated to vary the clear-cut line within the range of CL1 to CL3. The gear 28 is in mesh with a gear 42 mounted on the output shaft of an angular position sensing means 40, such as a rotary encoder or a potentiometer. The angular position sensing means 40 senses the angular position of the shade 20 and outputs the sensed angular position to the control unit (microcomputer) 50 (FIG. 6).

FIG. 6 shows the overall arrangement of the light distribution control device according to the present invention. A laser radar S is mounted on a motor vehicle. The laser radar S is a vehicle-to-vehicle distance measuring sensor for measuring the distance between two vehicles, i.e., the vehicle carrying the control unit 50 in question (referred to as the first vehicle) and another vehicle (referred to as the second vehicle) running ahead of the first vehicle.

The output signal of the laser radar S is output to the control unit (microcomputer) 50 as a shade rotation control unit. The control unit 50 differentiates distance data sequentially coming from the laser radar S. If the result of the differentiation is larger than a preset value, the control unit 50 determines that the second vehicle is an approaching vehicle. If the differentiation result is smaller than the preset value, the control unit 50 determines that the second vehicle is a forerunning vehicle.

Proper shade angular positions θ where light of the headlamp at the eye point specified by the vehicle-to-vehicle distance d and the rotational angle of the steering wheel β is below a tolerable quantity of glare VGa are previously obtained and stored in the form of table data in a memory of the control unit (microcomputer) 50. The loci of the eyes of the drivers in an approaching vehicle and a forerunning vehicle, i.e., the loci of the eye points, are respectively indicated by straight lines $E_1$ and $E_2$ on a light distribution screen shown in FIG. 5 ($E_1$ designates the locus of the eye point in an approaching vehicle and $E_2$, the locus of the eye point in a forerunning vehicle). If the distance d between the first and second vehicles and the angle α(eye point angle) between the optical axis of the headlamp (the axis of the first vehicle) and the second vehicle are known, the position (eye point) of the eyes of the driver in the second vehicle (approaching or forerunning vehicle) is specified on the straight line $E_1$ or $E_2$. A shade angular position having a clear-cut line that causes the glare quantity VG at the specified position (eye position) to be smaller than a maximum tolerable value is also specified. To be more specific, the glare quantity VG is mathematically expressed by $$VG = K \cdot I(\alpha)/d^2(\alpha + 1.5°)\alpha$$

where d: vehicle-to-vehicle distance of the two vehicles;

α: eye point angle;

I(α): intensity of the light directed to the eye point; and

K: constant.

Figure 7B:
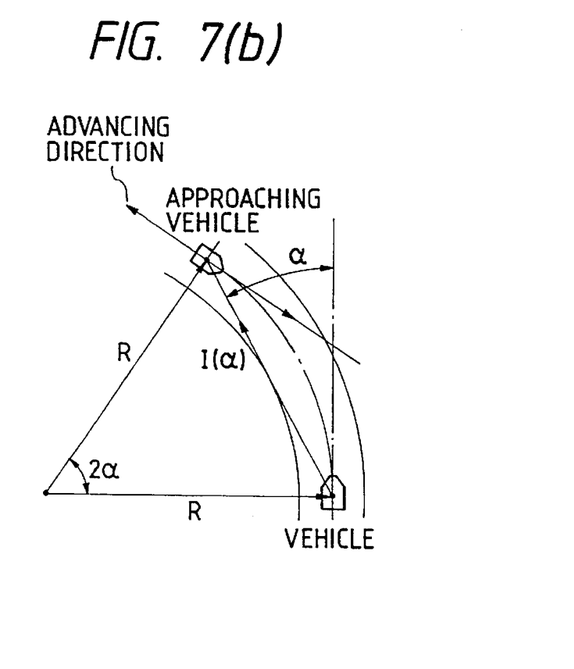
Figure 7C:
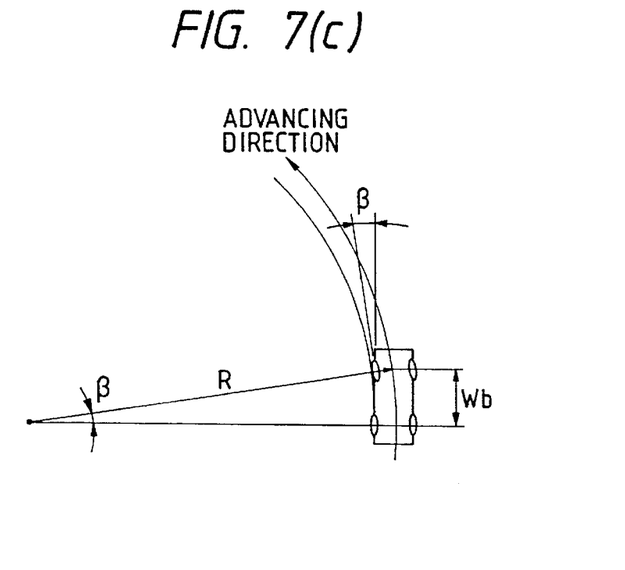

FIGS. 7(a) and 7(b) are diagrams for explaining the relationships of a first vehicle and an approaching vehicle when the vehicles run on a straight road and a curved road. When the vehicles run on a straight road, the horizontal distance between the first vehicle and the second vehicle (approaching vehicle) is substantially equal to the lane width $W_a$. Accordingly, if the vehicle-to-vehicle distance d is known, an eye point angle α(=d·$W_a$) is determined. Once the eye point angle α is determined, the light intensity I(α) is also determined, and hence the glare quantity VG can be calculated. When the vehicle runs on a curved road, the radius R of curvature (=$W_b$/sin β) of the curved road can be obtained using the steering angle β of the steering wheel and the distance $W_b$ between the front and rear wheels. Using the radius of curvature R and the vehicle-to-vehicle distance d, the eye point angle α(=·180°/2πR) and the light quantity I(α). By using the light quantity I(α), the vehicle-to-vehicle distance d, and the eye point angle α, the glare quantity VG can be calculated using the following formula:

$$VG = K \cdot I(\alpha/d^2(\alpha+1.5°)\alpha.$$

Optimal shade angular positions θ where the glare quantity VG at the eye point specified by the vehicle-to-vehicle distance d and the steering angle of the steering wheel β is below a tolerable quantity of glare VGa are previously stored in the form of table data in the memory of the control unit 50. The control unit 50 computes a necessary quantity of rotation of the shade 20 (Δθ=θ−θ₀) using the distance data (vehicle-to-vehicle distance d) from the laser radar S, angular data (rotational (steering) angle of the steering wheel β) from the steering sensor 48, present angular position data θ₀ (θ₀R, θ₀L) of the shade 20 derived from the angular position sensor 40 (a shade angular position sensor 40R for the right headlamp, and a shade angular position sensor 40L for the left headlamp), and the previously stored table data on the optimal angular position θ of the shade 20, and controls a motor drive circuit 51 so that the shade 20 is set at the optimal angular position θ. As a result, the shades 20 (the shades 20 in the right and left headlamps) are rotated, so that the clear-cut line is adjusted at such an optimal position as to cause no glare to a driver in the second vehicle (approaching or forerunning vehicle).

Reference numeral 49 designates a speed sensor. The speed sensor is used in order to set the range of the vertical movement of the clear-cut line (the range of rotation of the shade) in accordance with the vehicle's speed. When the vehicle speed is higher than a preset speed or the vehicle is at a standstill, the clear-cut line is set at a normal position so as not to blind the forerunning or approaching driver.

Reference numeral 45 designates a high/low beam switch. This switch is used to set the shade at such an angular position that the clear-cut line is at the highest position in order to improve the visual recognition in the long range illumination. Use of this switch is effective when there are no forerunning or approaching vehicles.

The light distribution control device is ideally operated when the control-device carrying vehicle is operated on a road not having a median strip, where there are few houses along the sides of the road, rather than suburban roads or roads in the mountains. Road surroundings, such as other streets, mountains, and median strips (in a freeway) can cause various types of noise in the output data signals of the laser radar S. A mode select switch 62 is used to remove disturbance noise caused by road surroundings by filtering and set a tolerable quantity of clear-cut line changes. For example, in a case where a median strip is present, the amount of glare to the approaching driver is naturally lessened. In this case, this switch functions to ease the clear-cut line moving conditions.

Curves $B_1$ and $B_2$ in FIGS. 8 and 9 represent variations of an amount of glare and a visual recognition distance with respect to distance relative to an approaching vehicle when the clear-cut line is adjusted using the light distribution control device of the present embodiment, in comparison with those of the conventional headlamp.

As indicated by the curve B1 in FIG. 8, in the light distribution by the headlamp using the light distribution control device, the glare quantity VG is greatly below the tolerable glare quantity VG. Accordingly, no glare is caused to approaching drivers. As seen from the curve $B_2$ in FIG. 9, in the long range illumination by the headlamp equipped with the light distribution control device of the invention, a satisfactory visual recognition distance (approximately 80 m) is obtained, which is just slightly shorter than the 100 m visual recognition distance of the high beam (H.B.). On the other hand, for short range illumination, a recognition distance of approximately 70 to 80 m is secured, which is considerably longer than the 60 to 70 m recognition distance of the conventional low beam (L.B.). Thus, the visual recognition obtained with the invention is excellent.

Figure 10:
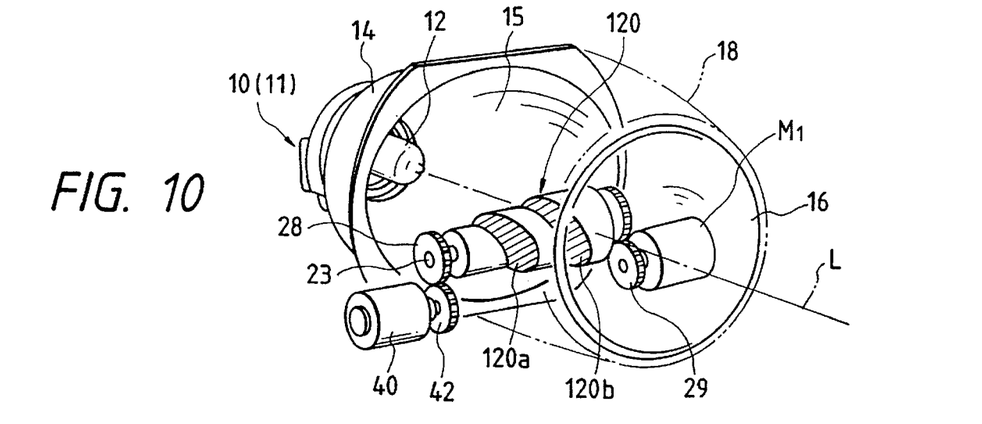
FIG. 10 is a perspective view showing another embodiment of a headlamp for a motor vehicle according to the present invention.
Figure 11A:
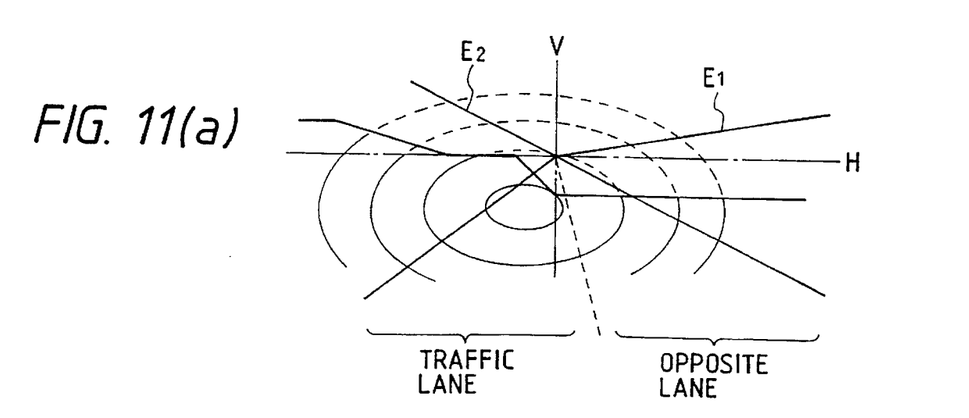
FIGS. 11(a) and 11(b) are diagrams showing a positional change of the clear-cut line in light distribution patterns formed by the headlamp.
Figure 11B:
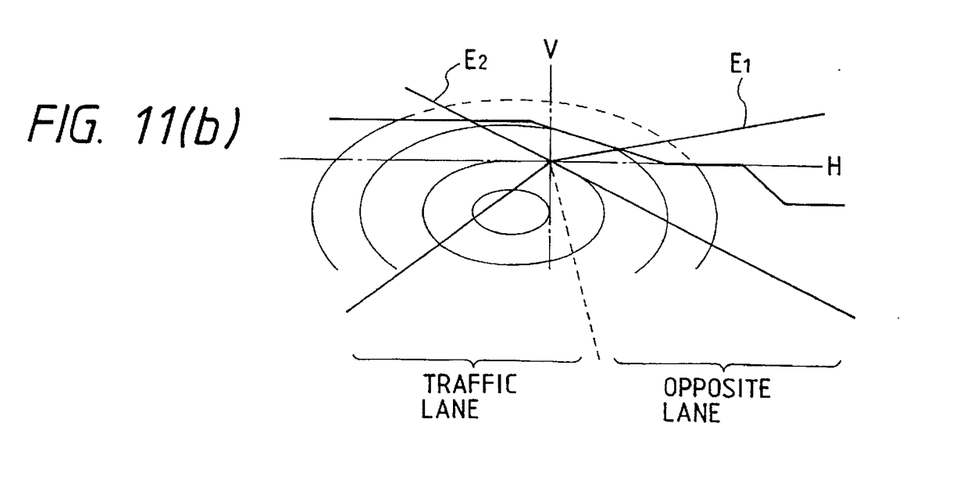

FIGS. 10, 11(a) and 11(b) cooperate to show another embodiment of the present invention. Of these figures, FIG. 10 is a perspective view showing the inner structure of a headlamp for a motor vehicle used for a light distribution control device, and FIGS. 11(a) and 11(b) are diagrams showing light distribution patterns formed by the headlamp.

In the headlamp of the first embodiment, the clear-cut line CL is vertically moved by rotating the shade 20 having the left shade 21 and the right shade 22 about the horizontal support shaft 23, which is eccentric with respect to the shade 20. In the second embodiment, two steps are spirally formed on the outer surface of the shade 120, and slanted at different angles (the step slanted at 15° is designated by reference numeral 120a, and the step slanted at 45° by 120b). When the shade 120 is rotated about the horizontal support shaft 23, which is coaxial with the shade 120, the stepped part of the clear-cut line CL is horizontally moved, as shown in FIGS. 11(a) and 11(b). The remaining portions of the second embodiment are the same as those of the first embodiment. Hence, no further description will be given here, noting that like reference numerals designate like portions as in the previously described embodiments.

The control unit, i.e., the shade rotation control unit, receives distance information (vehicle-to-vehicle distance d) from the laser radar and angle information (steering angle of the steering wheel β) from the steering sensor 48, specifies an eye point on the basis of the vehicle-to-vehicle distance d and the steering angle of the steering wheel β, specifies a shade angular position to form the clear-cut line best for the eye point, calculates a necessary quantity of rotation of the shade 120, and controls the rotation of the shade 120. The optimal angular position of the shade at which the glare quantity at the eye point specified by the vehicle-to-vehicle distance and the steering angle of the steering wheel is below a tolerable quantity of glare VGa is stored in advance in the form of table data in the control unit. The control unit controls the shade so as to rotate by a preset angle of rotation on the basis of the data from the laser radar and the steering sensor. When an approaching vehicle (or forerunning vehicle) is at a short distance, the light distribution pattern shown in FIG. 11(a) is formed. When an approaching vehicle (or forerunning vehicle) is at a long distance, the light distribution pattern shown in FIG. 11(b) is formed. These light distribution patterns provides good visual recognition and cause no glare to the driver in the approaching (or forerunning) vehicle.

In the above-mentioned embodiment, the right and left shades 22 and 21 of the shade 20 of the headlamp are integral with each other. If required, the shades 21 and 22 may be formed separately and rotated independently under control of the control unit. In this case, the degree of freedom in forming the clear-cut line in increased. Therefore, the visual recognition by the driver of the first vehicle is further improved.

As seen from the foregoing description, the optimal angular position of the shade at which the quantity of glare at the eye point specified by a vehicle-to-vehicle distance and the steering angle of the steering wheel is smaller than a tolerable quantity of glare is stored in the form of table data in the control unit. The control unit controls the shade so as to rotate by a preset quantity of rotation on the basis of the data from the laser radar and the steering sensor.

The table data may be appropriately set according to customer's actual demand for a specific vehicle.

What is claimed is:

1. A light distribution control device for a vehicular headlamp, comprising:

a sensor for measuring a distance between a first vehicle carrying said control device and a second vehicle running in front of said first vehicle;

a rotatable shade for setting a cut-line in an output beam from said headlamp in accordance with a rotational position of said shade; and a shade rotation control unit for controlling the rotational position of the shade, and for storing as table data rotational positions of the shade at which a quantity of glare at eye points specified by corresponding distances between vehicles is smaller than a tolerable quantity of glare, the control unit controlling the rotational position of the shade on the basis of distance information provided by the sensor and the table data;

wherein the table data contains data representative of shade angular positions for approaching and forerunning vehicles, and said shade rotation control unit differentiates distance information sequentially obtained from said sensor with respect to time and determines whether the vehicle running in front of the control-device carrying vehicle is an approaching vehicle or a forerunning vehicle based on speed information resulting from the differentiation.

2. A light distribution control device for a headlamp for a motor vehicle comprising:

a projection type headlamp for a motor vehicle having a rotatable shade rotatable about a horizontal support shaft, whereby a clear-cut line in a light distribution pattern formed by said projection type headlamp is varied by rotating said shade;

a vehicle-to-vehicle distance measuring sensor for measuring a distance between a first vehicle carrying the light distribution control device and a second vehicle running in front of the first vehicle;

a steering sensor for measuring a steering angle of a steering wheel of the first vehicle; and a shade rotation control unit for controlling the rotational position of the shade, and for storing as table data rotational positions of the shade at which a quantity of glare at eye points specified by corresponding distances between vehicles and steering angles of the steering wheel is smaller than a tolerable quantity of glare, the control unit controlling the rotational position of the shade on the basis of distance information provided by the distance measuring sensor, the steering angle of the steering wheel provided by the steering sensor, and the table data.

3. The light distribution control device according to claim 2, in which the table data contains data representative of angular positions of the shade for approaching and forerunning vehicles, and said shade rotation control unit differentiates distance information sequentially obtained from said vehicle-to-vehicle distance measuring sensor with respect to time, and determines whether the vehicle running in front of the control-device carrying vehicle is an approaching vehicle or a forerunning vehicle based on speed information resulting from the differentiation.

4. A light distribution control device for a vehicular headlamp, comprising:

a reflector;

a light source mounted on said reflector, said light source having a first focal position and a second focal position;

a rotation shade located approximately at said second focal position of said light source, said shade varying a light distribution of said headlamp in accordance with a rotational position of said shade;

a frame for rotationally supporting said shade;

a motor for rotating said shade;

sensor means for measuring a distance between a first vehicle upon which said light distribution control device is mounted and a second vehicle running in front of the first vehicle; and means for controlling a rotational angle of said shade by determining an eye point angle with respect to an optical axis of the headlamp in accordance with an output of said sensor means, by determining an intensity of light directed to said eye point, and by calculating an amount of glare based on said distance, said eye point angle, and said intensity;

wherein said shade comprises two steps spirally formed on an outer surface thereof and slanted at different angles.

5. The light distribution control device according to claim 4, wherein said angles of said slanted steps are approximately, 150° and 45° respectively.

6. A light distribution control device for a vehicular headlamp, comprising:

a reflector;

a light source mounted on said reflector, said light source having a first focal position and a second focal position;

a rotation shade located approximately at said second focal position of said light source, said shade varying a light distribution of said headlamp in accordance with a rotational position of said shade;

a frame for rotationally supporting said shade;

a motor for rotating said shade;

sensor means for measuring a distance between a first vehicle upon which said light distribution control device is mounted and a second vehicle running in front of the first vehicle; and means for controlling a rotational angle of said shade by determining an eye point angle with respect to an optical axis of the headlamp in accordance with an output of said sensor means, by determining an intensity of light directed to said eye point, and by calculating an amount of glare based on said distance, said eye point angle, and said intensity;

wherein said shade is mounted on said frame so as to rotate eccentrically about an axis of said shade.

7. A light distribution control device for a vehicular headlamp, comprising:

a reflector;

a light source mounted on said reflector, said light source having a first focal position and a second focal position;

a rotation shade located approximately at said second focal position of said light source, said shade varying a light distribution of said headlamp in accordance with a rotational position of said shade;

a frame for rotationally supporting said shade;

a motor for rotating said shade;

sensor means for measuring a distance between a first vehicle upon which said light distribution control device is mounted and a second vehicle running in front of the first vehicle; and means for controlling a rotational angle of said shade by determining an eye point angle with respect to an optical axis of the headlamp in accordance with an output of said sensor means, by determining an intensity of light directed to said eye point, and by calculating an amount of glare based on said distance, said eye point angle, and said intensity;

wherein said shade comprises a first gear at a first end of said shade and a second gear at a second end of said shade, said first gear engaging with a gear mounted on a rotation shaft of said motor.

8. The light distribution control device according to claim 7, further comprising an angular position sensor engaged with said second gear of said shade.

9. The light distribution control device according to claim 8, wherein said angular position sensor comprises a rotary encoder.

10. The light distribution control device according to claim 8, wherein said angular position sensor comprises a potentiometer.

11. A light distribution control device for a vehicular headlamp, comprising:

a reflector;

a light source mounted on said reflector, said light source having a first focal position and a second focal position;

a rotation shade located approximately at said second focal position of said light source, said shade varying a light distribution of said headlamp in accordance with a rotational position of said shade;

a frame for rotationally supporting said shade;

a motor for rotating said shade;

sensor means for measuring a distance between a first vehicle upon which said light distribution control device is mounted and a second vehicle running in front of the first vehicle; and means for controlling a rotational angle of said shade by determining an eye point angle with respect to an optical axis of the headlamp in accordance with an output of said sensor means, by determining an intensity of light directed to said eye point, and by calculating an amount of glare based on said distance, said eye point angle, and said intensity;

wherein the headlamp is a projection type headlamp.

12. A light distribution control device for a vehicular headlamp, comprising:

a reflector;

a light source mounted on said reflector, said light source having a first focal position and a second focal position;

a rotation shade located approximately at said second focal position of said light source, said shade varying a light distribution of said headlamp in accordance with a rotational position of said shade;

a frame for rotationally supporting said shade;

a motor for rotating said shade;

sensor means for measuring a distance between a first vehicle upon which said light distribution control device is mounted and a second vehicle running in front of the first vehicle; and means for controlling a rotational angle of said shade by determining an eye point angle with respect to an optical axis of the headlamp in accordance with an output of said sensor means, by determining an intensity of light directed to said eye point, and by calculating an amount of glare based on said distance, said eye point angle, and said intensity;

wherein the amount of glare is calculated according to the following equation:

$$VG=K*I(\alpha)/d^2(\alpha+1.5°)\alpha$$

where VG is the amount of glare, $I(\alpha)$ is the intensity of light, d is the distance between the first vehicle and the second vehicle, and $\alpha$ is the eye point angle.

13. A light distribution control device as recited in claim 12, wherein the eye point angle $\alpha$ is calculated according to the following equation:

$$\alpha=d*W_a$$

where d is the distance between the first vehicle and the second vehicle running on a straight road, and $W_a$ is a lane width.

14. A light distribution control device as recited in claim 12, wherein the eye point angle $\alpha$ is calculated according to the following equation:

$$\alpha=d*180°/2\pi R$$

where d is the distance between the first vehicle and the second vehicle running on a curved road, and R is a radius of curvature of the curved road.

* * * * *